(12) United States Patent
Grothe et al.

(10) Patent No.: US 11,628,420 B2
(45) Date of Patent: *Apr. 18, 2023

(54) POWDERED TITANIUM OXIDE, METHOD FOR THE PRODUCTION THEREOF, AND USE THEREOF

(71) Applicant: HUNTSMAN P&A GERMANY GMBH, Duisburg (DE)

(72) Inventors: Sonja Grothe, Oberhausen (DE); Tobias Thiede, Herne (DE)

(73) Assignee: HUNTSMAN P&A GERMANY GMBH, Duisburg (DE)

( * ) Notice: Subject to any disclaimer, the term of this patent is extended or adjusted under 35 U.S.C. 154(b) by 1084 days.

This patent is subject to a terminal disclaimer.

(21) Appl. No.: 15/573,841

(22) PCT Filed: May 13, 2016

(86) PCT No.: PCT/EP2016/060840
§ 371 (c)(1),
(2) Date: Nov. 14, 2017

(87) PCT Pub. No.: WO2016/184805
PCT Pub. Date: Nov. 24, 2016

(65) Prior Publication Data
US 2018/0280932 A1    Oct. 4, 2018

(30) Foreign Application Priority Data

May 15, 2015   (DE) ...................... 10 2015 107 664.0

(51) Int. Cl.
*B01J 21/06* (2006.01)
*B01J 37/04* (2006.01)
(Continued)

(52) U.S. Cl.
CPC ........ *B01J 21/063* (2013.01); *B01D 53/8628* (2013.01); *B01J 21/08* (2013.01); *B01J 23/28* (2013.01); *B01J 23/882* (2013.01); *B01J 23/883* (2013.01); *B01J 35/004* (2013.01); *B01J 35/1014* (2013.01); *B01J 35/1019* (2013.01); *B01J 35/1038* (2013.01); *B01J 35/1042* (2013.01); *B01J 35/1061* (2013.01); *B01J 35/1066* (2013.01); *B01J 37/009* (2013.01); *B01J 37/0027* (2013.01); *B01J 37/0045* (2013.01); *B01J 37/0213* (2013.01); *B01J 37/033* (2013.01); *B01J 37/035* (2013.01); *B01J 37/04* (2013.01); *B01J 37/06* (2013.01); *B01J 37/088* (2013.01); *B01J 37/20* (2013.01); *C01G 23/00* (2013.01); *C01G 23/04* (2013.01); *B01D 2255/20707* (2013.01);
(Continued)

(58) Field of Classification Search
CPC ........ B01J 21/063; B01J 23/28; B01J 37/035; B01J 37/0045; B01J 37/033; B01J 37/0213; B01J 37/20; B01J 37/088; B01J 35/1066; B01J 37/0027; B01J 37/009; B01J 37/06; B01J 37/04; B01J 21/08; B01J 23/882; B01J 23/883; B01J 35/004; B01J 35/1014; B01J 35/1019; B01J 35/1038; B01J 35/1042; B01J 35/1061; B01J 35/023; B01J 2523/00; B01J 2523/41; B01J 2523/47; B01J 2523/68; B01J 2523/845; B01J 2523/847; B01J 35/0006; B01J 35/0033; B01J 37/0018; B01J 21/06; B01J 32/00; C01G 23/00; C01G 23/04; C01G 23/043; B01D 53/8628; B01D 2255/802; B01D 2255/20746; B01D 2255/40; B01D 2255/20753; B01D 2255/20769; B01D 2258/0283; B01D 2257/404; B01D 2258/01; B01D 2255/9205; B01D 2255/9207; B01D 2258/0291; B01D 2255/20707; B01D 2255/30; C01P 2004/62; C01P 2006/12; C01P 2006/14; C01P 2004/32; C01P 2004/61; C01P 2004/64; C01P 2002/30; C01P 2006/17; C01P 2006/80; C01P 2006/16; C01P 2006/90; C02F 1/30; C10G 45/08
USPC ......................................................... 502/242
See application file for complete search history.

(56) References Cited

U.S. PATENT DOCUMENTS

| | | | |
|---|---|---|---|
| 4,814,153 | A | 3/1989 | Kobayashi et al. |
| 5,587,349 | A | 12/1996 | Abe et al. |
| 6,419,889 | B1 | 7/2002 | Boxhoorn et al. |
| 6,956,006 | B1 | 10/2005 | Mirsky et al. |
| 7,125,536 | B2 | 10/2006 | Fu et al. |
| 8,545,796 | B2 | 10/2013 | Chapman |

(Continued)

FOREIGN PATENT DOCUMENTS

| DE | 36 19 337 A1 | 12/1986 |
|---|---|---|
| DE | 10 2011 051 334 A1 | 12/2011 |

(Continued)

*Primary Examiner* — Colin W. Slifka
(74) *Attorney, Agent, or Firm* — Norman B. Thot

(57) ABSTRACT

A powdered catalyst material on a titanium oxide basis. The powdered catalyst material includes a combined content of at least 90 wt.-% of a hydrated titanium oxide having the general formula $TiO_{(2-x)}(OH)_{2x}$, with $0<x\leq1$, (calculated as $TiO_2$), and a silicon dioxide and hydrated precursors of the silicon dioxide (calculated as $SiO_2$). A weight ratio of $TiO_2/SiO_2$, determined for $TiO_2$ and $SiO_2$ respectively, is at least 3 and less than 30. The wt.-% is based on a total weight of the catalyst material after the catalyst material has been dried at 105° C. for at least 2 hours. The powdered catalyst material has a specific surface area of >300 m²/g and an isoelectric point of from 4.0 to 7.0.

19 Claims, No Drawings

(51) Int. Cl.
- *B01J 21/08* (2006.01)
- *B01D 53/86* (2006.01)
- *B01J 23/882* (2006.01)
- *B01J 23/883* (2006.01)
- *B01J 35/00* (2006.01)
- *B01J 35/10* (2006.01)
- *B01J 23/28* (2006.01)
- *B01J 37/03* (2006.01)
- *B01J 37/00* (2006.01)
- *B01J 37/02* (2006.01)
- *C01G 23/00* (2006.01)
- *C01G 23/04* (2006.01)
- *B01J 37/20* (2006.01)
- *B01J 37/08* (2006.01)
- *B01J 37/06* (2006.01)
- *B01J 35/02* (2006.01)

(52) U.S. Cl.
CPC ............ *B01D 2255/20746* (2013.01); *B01D 2255/20753* (2013.01); *B01D 2255/20769* (2013.01); *B01D 2255/30* (2013.01); *B01D 2255/40* (2013.01); *B01D 2255/802* (2013.01); *B01D 2255/9205* (2013.01); *B01D 2255/9207* (2013.01); *B01D 2257/404* (2013.01); *B01D 2258/01* (2013.01); *B01D 2258/0283* (2013.01); *B01D 2258/0291* (2013.01); *B01J 35/023* (2013.01); *B01J 2523/00* (2013.01); *B01J 2523/41* (2013.01); *B01J 2523/47* (2013.01); *B01J 2523/68* (2013.01); *B01J 2523/845* (2013.01); *B01J 2523/847* (2013.01); *C01P 2002/30* (2013.01); *C01P 2004/32* (2013.01); *C01P 2004/61* (2013.01); *C01P 2004/62* (2013.01); *C01P 2004/64* (2013.01); *C01P 2006/12* (2013.01); *C01P 2006/14* (2013.01); *C01P 2006/16* (2013.01); *C01P 2006/17* (2013.01); *C01P 2006/80* (2013.01); *C01P 2006/90* (2013.01)

(56) References Cited

U.S. PATENT DOCUMENTS

| | | |
|---|---|---|
| 2003/0103889 A1 | 6/2003 | Mirsky et al. |
| 2004/0238410 A1 | 12/2004 | Inoue et al. |
| 2007/0003464 A1 | 1/2007 | Schimanski et al. |
| 2007/0140952 A1 | 6/2007 | Inoue et al. |
| 2013/0172176 A1 | 7/2013 | Proft et al. |
| 2017/0056855 A1 | 3/2017 | Grothe et al. |

FOREIGN PATENT DOCUMENTS

| | | |
|---|---|---|
| DE | 10 2015 102 484 A1 | 8/2015 |
| EP | 0 668 100 A1 | 8/1995 |
| EP | 1 422 198 A1 | 5/2004 |
| EP | 1 712 520 A1 | 10/2006 |
| EP | 1 719 737 A1 | 11/2006 |
| WO | WO 01/14054 A1 | 3/2001 |

POWDERED TITANIUM OXIDE, METHOD FOR THE PRODUCTION THEREOF, AND USE THEREOF

CROSS REFERENCE TO PRIOR APPLICATIONS

This application is a U.S. National Phase application under 35 U.S.C. § 371 of International Application No. PCT/EP2016/060840, filed on May 13, 2016 and which claims benefit to German Patent Application No. 10 2015 107 664.0, filed on May 15, 2015. The International Application was published in German on Nov. 24, 2016 as WO 2016/184805 A1 under PCT Article 21(2).

FIELD

The present invention relates to a powdered, inorganically post-processed titanium oxide, a processes for preparing the same, and the use thereof in preparing catalysts, particularly for application as a photocatalyst and as a support for refinery catalysts.

BACKGROUND

A number of titanium dioxides, and also $TiO_2$—$SiO_2$ materials, have previously been described which are used as a catalyst and/or as a support for catalytically active materials.

Many $TiO_2$-based photocatalysts are offered commercially in the field of photocatalysis. These are usually in the form of anatase, anatase-rutile mixtures or doped titanium dioxides with a wide range of application possibilities. When exposed to UV irradiation during photocatalysis, gas-phase or dissolved materials are converted to titanium dioxide, most often anatase, in a free radical reaction or charge carrier transfer. Titanium dioxides with large surface areas, such as the commercially marketed products "HOMBIKAT UV100" or "HOMBIKAT M211", have good photocatalytic properties. It is still, however, desirable to further enhance the photocatalytic activity.

It has long been known to use titanium dioxide as a support material in the production of hydrotreating catalysts for hydrodesulfurisation (HDS) and hydrodenitrogenation (HDN). For example, U.S. Pat. No. 6,419,889 B1 describes the use of a titanium dioxide support with a specific surface area of 70 to 99 $m^2/g$ and a bimodal pore distribution, wherein 90% of the pores have a diameter of at least 100 nm. The thermal stability of pure titanium dioxide is, however, not good enough for hydrotreating applications, which typically take place at 400° C., which results in ageing effects and loss of catalytic activity.

It is generally known that $TiO_2/SiO_2$ materials can also be used as catalysts or as catalyst supports in a variety of catalytic applications, particularly as supports for selective catalytic reduction in the reduction of nitrogen oxides in exhaust gases from furnaces, incineration plants, gas turbines, industrial installations, internal combustion engines, and as V-SCR catalysts. $SiO_2$ is typically introduced to increase thermal stability in this context. However, when $SiO_2$ is added, a portion of the catalytically active titanium dioxide surface is covered with $SiO_2$, which limits its catalytic properties.

A number of processes are known for preparing $TiO_2/SiO_2$ materials of this kind. Some methods for producing such $TiO_2/SiO_2$ materials are based on precipitation from Ti-containing solutions (Ti-alkoxides, titanyl sulfate, titanium oxychloride etc.) with bases, with or without the addition of Si-containing solutions.

For example, EP 668 100 A1 describes a process for preparing a $TiO_2/SiO_2$ catalyst by adding an acid solution containing a silicon compound and a titanium compound dissolved therein to the solution of a basic compound to initiate coprecipitation.

DE 3 619 337 A1 describes the production of a $TiO_2/SiO_2$ powder by mixing an aqueous solution of titanium sulfate with an ammonium-containing, aqueous $SiO_2$ sol. The precipitate is washed, dried and calcined, and used to manufacture a catalyst material.

Besides the above, many sol-gel processes for preparing nano-$TiO_2$ from titanium-organic precursor stages are described in the literature. One example thereof is described in EP 1 719 737 A1.

The $SiO_2/TiO_2$ materials obtained by precipitation and the $SiO_2/TiO_2$ materials prepared with sol-gel processes are both almost amorphous, that is to say, signals are only very weakly detectable, if at all, by X ray diffractometry. These amorphous $TiO_2/SiO_2$ materials typically have very poor catalytic properties. In order to create active $TiO_2/SiO_2$ particles according to the prior art, thermal treatments such as hydrothermal treatments and/or calcination are necessary. These steps serve to increase crystallinity, but they also reduce the specific surface area of the hydroxy group content. This reduction is unfavorable for the catalytic applications.

Besides the option of mixing solutions containing Ti with solutions containing Si and then initiating precipitation as described above, the prior art also includes descriptions of processes for precipitating Si compounds onto particulate titanium dioxide.

U.S. Pat. No. 6,956,006 describes a composite material containing silicon and titanium dioxide in which the pore structure exhibits improved thermal and hydrothermal resistance. The composite material can be obtained by precipitating titanium hydroxide from an aqueous solution containing sulfate salts and urea, followed by hydrothermal treatment in the mother liquor and then reacting the precipitate with a basic colloidal silica.

WO 01/14054 A1 describes a process for preparing mesoporous $TiO_2/SiO_2$ material in powder form in which titanium dioxide in the form of a titanium hydroxide is first precipitated out and then a $SiO_2$ component is added.

U.S. Pat. No. 7,125,536 B2 describes a process for preparing nanostructured particles with high thermal stability by precipitation of zirconium or titanium salts with a base, adding a stabilizing agent such as fumed silica, hydrothermal aging, washing, drying and calcining.

In the process described in U.S. Pat. No. 8,545,796 B2, a titanium dioxide suspension is mixed with a source of Si, and the pH value is then adjusted to <8.5 so that $SiO_2$ is precipitated onto the $TiO_2$ particles. The products prepared in this way have specific surface areas of <400 $m^2/g$ and pore volumes of <0.4 $cm^3/g$.

In the processes cited above for precipitating $SiO_2$ onto particulate titanium dioxide, it was found that the addition of $SiO_2$ has the effect of covering part of the catalytically active titanium dioxide surface, thereby diminishing its catalytic properties.

SUMMARY

An aspect of the present invention is to provide a powdered catalyst material on a titanium oxide basis that combines good thermal stability with very large specific surface areas, high pore volumes and marked crystallinity, so as to have excellent properties as catalysts or precursor materials even at elevated application temperatures.

In an embodiment, the present invention provides a powdered catalyst material which includes a combined content of at least 90 wt.-% of a hydrated titanium oxide having the general formula $TiO_{(2-x)}(OH)_{2x}$, with $0<x\leq1$, (calculated as $TiO_2$), and a silicon dioxide and hydrated precursors of the silicon dioxide (calculated as $SiO_2$). A weight ratio of $TiO_2/SiO_2$, determined for $TiO_2$ and $SiO_2$ respectively, is at least 3 and less than 30. The wt.-% is based on a total weight of the catalyst material after the catalyst material has been dried at 105° C. for at least 2 hours. The powdered catalyst material has a specific surface area of >300 m²/g and an isoelectric point of from 4.0 to 7.0. The present invention thereby provides titanium dioxides that combine good thermal stability with very large specific surface areas, high pore volumes, and marked crystallinity which have excellent properties as catalysts or precursor materials even at elevated application temperatures. The inorganically post-processed, powdered titanium oxide according to the present invention has significantly enhanced catalytic properties as well as good thermal stability, thus overcoming the disadvantages of the prior art.

DETAILED DESCRIPTION

The inorganically post-processed, powdered titanium oxide of the present invention is in particular characterized by the following properties:
- a combined content of at least 90% by weight hydrated titanium oxide having the general formula $TiO_{(2-x)}(OH)_{2x}$, wherein $0<x\leq1$, in particular $0.1<x\leq1$, (calculated as $TiO_2$), and silicon dioxide including hydrated precursor forms thereof (calculated as $SiO_2$), wherein the $TiO_2/SiO_2$ weight ratio, in which $TiO_2$ and $SiO_2$ are each determined as described in the method, is at least 3, for example, at least 5, and less than 30, for example, less than 25, and the % by weight is relative to the total weight of the catalyst material after it has been dried at 105° C. for at least 2 hours; wherein the remainder to 100% by weight consists of bound water and traces of by-elements as explained below;
- the specific surface area of the dried product is >300 m²/g, for example, >350 cm²/g; and
- the isoelectric point is in the pH range from: 4.0 to 7.0, for example, 4.5 to 5.9, for example, 4.7 to 5.9.

When the material is dried at 105° C. for at least 2 hours, the directly prepared inorganically post-processed, powdered titanium oxide as the product according to the present invention undergoes a loss of weight of up to 10%, wherein most of the weight loss is accounted for by water. Besides the water that is then still bound in the inorganically post-processed, powdered titanium oxide which has been dried as before, which can account for up to 7% by weight of the product dried at 105° C. and can only be driven off at higher temperatures from about 200 to 800° C., traces of by-elements such as Na, K, Ca, Mg, Cl, sulfates, nitrates, Nb, Zr, Fe, Cr, V, Li, Al may be contained as constituents of the product in a combined total amount not exceeding 3%. The total content of $TiO_2$ plus $SiO_2$ in the directly prepared inorganically post-processed, powdered titanium oxide as the product is thus at least 90% by weight after drying at 105° C. as described. Regardless of the degree of drying, the $TiO_2/SiO_2$ weight ratio in the inorganically post-processed titanium oxide according to the present invention is between 3 and 30, which is also unaffected by other components.

The inorganically post-processed titanium oxide according to the present invention may accordingly also be described as a powdered catalyst material containing titanium oxide having the general formula $TiO_{(2-x)}(OH)_{2x}$ with $0<x\leq1$, in particular $0.1<x\leq1$, and silicon dioxide including precursor forms thereof, with a $TiO_2/SiO_2$ weight ratio of at least 3, for example, at least 5, and less than 30, for example, less than 25, having a specific surface area of >300 m²/g and an isoelectric point in the range from 4.0 to 7.0, wherein the total content of $TiO_2$ plus $SiO_2$ in the directly prepared powdered, inorganically post-processed titanium oxide is at least 80% by weight, and the rest up to 100% by weight is made up of bound water and traces of by-elements as described in the preceding, which originate from the production process and the starter material, such as ilmenite.

In this context, the powdered, inorganically post-processed titanium oxide may advantageously also have at least one of the following properties:
- a particle size not exceeding 1 mm, as classified by sieving;
- the specific surface area of the product after thermal treatment for 1 hour at 500° C. in a normal atmosphere is still at least 80 m²/g, in particular at least 100 m²/g, for example, more than 150 m²/g;
- a photocatalytic activity, measured by a degradation rate of chloroform, of more than 0.3 mmol/(h*m²), in particular more than 0.5 mmol/(h*m²), for example, more than 0.6 mmol/(h*m²), and, for example, more than 0.7 mmol/(h*m²), measured according to the process described in the method section;
- a pore volume ($N_2$ desorption, total)>0.3 cm³/g, for example, >0.5 cm³/g, for example, >0.7 cm³/g;
- an anatase phase with crystallite sizes from 5 to 15 nm; and
- a pore distribution with a maximum in the range from 10 to 35 nm, in particular in the range from 10 to 30, for example, 20 to 30 nm.

Titanium oxide or a titanium oxide suspension according to the present invention is understood to mean a titanium-oxygen compound according to the present invention with the formula $TiO_{(2-x)}(OH)_{2x}$ ($0<x\leq1$) and also as a titanium dioxide hydrate which can also be described as $TiO_2$ and $TiO(OH)_2$ side by side or the aqueous suspension thereof.

Oxides in contact with electrolytes develop electrical charges on their surfaces due to dissociation processes, and the magnitude and polarity of these charges at a certain pH value are characteristic of the oxide concerned. The pH value at which the surface does not carry a charge is called the isoelectric point (IEP). With pH values above the IEP, the surface is always negatively charged, below the IEP it is always positively charged. The isoelectric point of pure titanium dioxide or titanium oxide hydrate is at about pH 6. The isoelectric point of $SiO_2$ is at pH=2 to 3. Accordingly, this "isoelectric point" (IEP) can be used as a measurement of the degree to which the surface area of titanium dioxide particles is covered with $SiO_2$. The coverage of the titanium dioxide/titanium oxide hydrate surface area with $SiO_2$ causes the isoelectric point to shift in the range from pH 5 to 2, depending on the percentage of the titanium dioxide surface area that is covered with $SiO_2$. When 100% of the titanium dioxide surface area is covered with $SiO_2$, the IEP of the $SiO_2/TiO_2$ is at about pH=3 to 2. The less the IEP is shifted towards pH=2 due to the treatment of the titanium dioxide surface areas with $SiO_2$, the lower the percentage of the surface area that has been covered with $SiO_2$. Conversely, this increases the percentage of the particle surface area that consists of titanium dioxide, which in turn leads to an increase in catalytic activity. At the same time, the percentage of the titanium dioxide surface area that is covered with $SiO_2$ depends not only on the $SiO_2$ content, but also by the Si treatment process. It follows that the catalytic performance is determined not only by the structural properties (5-point BET, pore volume) and the absolute $SiO_2$ content, but also by the method by which the $SiO_2$ is spread over the $TiO_2$ surface.

The inventors have made use of this discovery when developing the present inventive process and the powdered inorganically post-processed titanium oxide prepared according to this process. The inventors have accordingly prepared a powdered, inorganically post-processed titanium oxide with defined crystalline regions mainly with anatase modification, in which a part of the surface area is covered with $SiO_2$ or hydrated precursor stages or mixtures thereof, wherein the product as a whole is called an Si-containing compound, and is thus able to lend the material increased thermal stability after drying while its catalytic activity is practically unchanged. According to discoveries made by the inventors, these properties may be obtained due to the fact that $SiO_2$ and hydrated precursors thereof precipitated onto the individual titanium oxide particles with the general formula $TiO_{(2-x)}(OH)_{2x}$, in which $0<x\le1$, keeps the individual $TiO_2$ particles "apart" during drying so that individual crystalline $TiO_2$ regions are not able to coalesce, with the result that a surface area with sufficient catalytic activity is preserved.

According to the present invention, the inorganically post-processed, powdered titanium oxide is thus obtained by treating a suspension of titanium oxide particles having the formula $TiO_{(2-x)}(OH)_{2x}$ $(0<x\le1)$ with the one or more Si containing compounds in suspension, so that some of the surface area of the titanium oxide particles is coated therewith.

The present invention therefore provides a process for preparing a catalyst material on a titanium oxide basis in powder form, in which:

an aqueous suspension of titanium oxide hydrate particles and/or hydrated titanium oxide having the general formula $TiO_{(2-x)}(OH)_{2x}$, wherein $0<x\le1$, in particular $0.1<x\le1$, or mixtures thereof, called "titanium oxide suspension" in the following, with medium sized particles from 20 to 500 nm, is mixed by intensive stirring and/or dispersion with a solution of a Si-containing compound, for example, while maintaining a pH at pH values from pH=3 to 9, in particular 4 to 7, the pH value can optionally be re-adjusted to the range between 4 and 7 if necessary, the suspension obtained is filtered, the filter cake obtained is optionally washed with water until the filtrate has a conductivity not exceeding 500 µS/cm, and the product obtained is dried.

The pH value of the titanium oxide suspension may be adjusted to pH values from 3.0 to 9.0, in particular 4.0 to 8.5, for example, 4.0 to 7.5, for example, 4.0 to 7.0, by adding an acid or a base before the Si-containing solution is added. The pH value may be maintained at the previously set pH value while the Si-containing solution is being added.

In this context, the quantities of titanium oxide-containing suspension and of the solution of Si-containing compound are selected so that, after drying at 105° C. for at least 2 hours as described above, the product according to the present invention has a total content of at least 90% by weight $TiO_2$ plus $SiO_2$.

In an embodiment, the suspension of titanium oxide particles having the formula $TiO_{(2-x)}(OH)_{2x}$ $(0<x\le1)$ can, for example, be metatitanic acid with the formula $TiO(OH)_2$, which is precipitated as an intermediate product in the sulfate process used to prepare titanium dioxide.

In other manufacturing processes, the suspension of titanium oxide particles with the formula $TiO_{(2-x)}(OH)_{2x}$ $(0<x\le1)$ may also be obtained from Ti-containing solutions, in particular from hydrolysable compounds such as $TiOSO_4$- or $TiOCl_2$-containing solutions by precipitation, hydrolysis or sol-gel processes, although the titanium oxide particles with the formula $TiO_{(2-x)}(OH)_{2x}$ $(0<x\le1)$ can, for example, be obtained by the sulfate process.

The "titanium oxide suspension", which represents the suspension of titanium oxide hydrate and/or hydrated titanium oxide particles with the general formula $TiO_{(2-x)}(OH)_{2x}$, wherein $0<x\le1$, in particular $0.1<x\le1$, or mixtures thereof, can, for example, have the following properties:

a Ti content calculated as titanium dioxide of 50 to 400 g $TiO_2/l$;

an average particle size of 20 nm to 1000 nm, for example, 20 nm to 500 nm, for example, 50 nm to 200 nm, for example, 50 to 150 nm;

a specific particle surface area of 200 to 500 m²/g, for example, 200 to 400 m²/g, for example, 300 to 400 m²/g (measured by $N_2$ porosimetry, 5-point BET after drying at 105° C. for at least 120 min);

a total pore volume of the particles of >0.3 cm³/g, for example, >0.5 cm³/g, for example, >0.7 cm³/g (measured by $N_2$ porosimetry, 5-point BET after drying at 105° C. for at least 120 min); and after drying at 105° C. for at least 120 min, most of the crystalline phases of the particles exist in the anatase phase, that is to say, after deduction of a linear subsurface, the ratio of the height of the most intense reflex of the anatase structure (reflex (101)) to height of the most intense reflex of the rutile structure (reflex (110)) is at least 5:1, for example, at least 10:1. An XRD analysis conducted according to the description in the "Methods" section of this document can, for example, involve only reflexes of an anatase structure.

The metatitanic acid used contains titanium-oxygen compounds and may also contain free and bound sulfuric acid, wherein the crystalline fractions of the titanium-oxygen compound are present in the anatase modification, as mentioned earlier, and have a typical crystallite size of about 5-15 nm. The titanium-oxygen compounds may be described with the general formula $TiO_{(2-x)}(OH)_{2x}$, wherein $0<x\le1$. The metatitanic acid is precipitated as an intermediate product when $TiO_2$ is prepared according to the sulfate process. In the sulfate process, ilmenite and/or slag is digested with 90% $H_2SO_4$, the digestion cake thus obtained is dissolved in water, and the solution is allowed to settle. The addition of scrap iron converts the trivalent dissolved iron to its bivalent form because $Fe^{3+}$ would be precipitated as $Fe(OH)_3$ together with the metatitanic acid and would then be adsorbed on it, which would be undesirable. Depending on the Fe content of the solution, $FeSO_4 \times 7\,H_2O$ is precipitated after the solution cools and is removed from the system. During the subsequent hydrolysis, the $TiOSO_4$ is converted into metatitanic acid. Other hydrated forms such as orthotitanic acid are converted into metatitanic acid and $H_2O$ is released.

According to the present invention, the (sulfuric acid) metatitanic acid may be neutralized, particularly with a base, for example, selected from NaOH, ammonia, calcium carbonate, calcium hydroxide, or also $Ba(OH)_2$.

The neutralized metatitanic acid obtained thereby can, for example, be washed with water until it reaches a conductivity of not more than 500 μS/cm in the filtrate, and the washed digestion cake is then placed in suspension or dispersed, for example, with a stirrer, for example, with a dissolver.

The intensive stirring or dispersion of the "titanium oxide suspension" can, for example, be carried out with the aid of a turbine stirrer, dissolver, torus mill, mill pump, gradient pump, batch bead mill or rotor-stator disperser (e.g., ULTRA-TURRAX manufactured by IKA).

The percentage by weight figures given in this description refer to the total weight of the powdered, inorganically post-processed titanium oxides according to the present invention after it has been dried at 105° C. for at least 120 minutes, and when added together, are equal to 100% by weight of the total weight of the material, wherein the optional components are included.

The titanium oxide particles of the material according to the present invention are irregularly shaped, and may be described approximately as spherical. The material is not in the shape of tubes, rods or platelets.

The Si-containing compound may in particular be a $Na_2SiO_3$ solution with a $SiO_2$ concentration of 50 to 500 g $SiO_2/l$, in particular 100 to 500 g $SiO_2/l$, for example, 200 to 400 g $SiO_2/l$. The Si-containing compound can, for example, be added as follows: a Si-containing solution, e.g., in the form of $Na_2SiO_3$ solutions with concentrations of $SiO_2$=50 to 500 g $SiO_2/l$, is added to the titanium oxide suspension having the formula $TiO_{(2-x)}(OH)_{2x}$ ($0<x\leq1$) during dispersion at a pH value of from 3 to 9, for example, pH 4 to 8.5, in particular 4 to 7.5, for example, pH=4 to 7, in particular 4.5 to 7, to obtain a $TiO_2/SiO_2$ weight ratio of at least 3.

The powdered titanium oxide-$SiO_2$ catalyst materials according to the present invention obtained may thereby be used to manufacture shaped bodies according to the present invention with the following process:
1. Preparing an aqueous titanium oxide-$SiO_2$ paste from:
   powdered titanium oxide-$SiO_2$ catalyst material according to the present invention, coated with extrusion aid(s);
   peptising agents, for example, hydrochloric acid, sulfuric acid, nitric acid, acetic acid, oxalic acid; and
   water, for example, demineralized water, and, as optional constituents,
   i. plasticizers such as cellulose, clay, polyvinyl alcohols, polyethylene glycol, for example, cellulose, for example, tylose,
   ii. binding agents such as $TiO_2$ sols, $TiOSO_4$ solution, alumina, $SiO_2$-sols or clays, for example, $TiO_2$ sol, $TiOSO_4$ solution or AlO(OH) (boehmite or pseudo-boehmite),
   iii. bases, for example, ammonia or amine-containing compounds,
   iv. lubricants such as glycerin, and
   v. pore generators such as starch or carbon black.
   In this context, the water content in the paste can, for example, be selected so that the paste can be forced through a nozzle with an outlet cross section from 1 to 5 mm by an extruder (dual auger) at pressures from 1 to 100 bar or up to 200 bar if necessary;
2. Kneading the paste obtained thereby, e.g., in a double z kneader, typically for 30 to 60 min;
3. Shaping, e.g., extruding the paste to produce shaped bodies such as ropes having a diameter from e.g., 1 to 5 mm and a length typically of 10 to 25 mm; and
4. Drying the shaped bodies such as extrudates initially at 20 to 30° C., in particular at 25° C., for a period of more than 1 hour, in particular more than 6, quite particularly more than 12 hours, then at 80 to 120° C., for example, at 90° C., for 60 to 120 minutes and then calcining at 300 to 600° C., in particular 350 to 600° C., for example, 350° C. to 450° C., in particular at 400° C., for 1-4 hours.

One or more compounds for coating the surface of the $TiO_2$—$SiO_2$ particles, which compounds evaporate, sublimate or decompose, for example, without residue, at temperatures below the conversion temperature from anatase into rutile (915° C.), for example, to below 600° C., for example, to below 400° C., may be used as auxiliary shaping agents. The extrusion aid supports shaping and can be left between and/or on the particles of the powdered catalyst material, and have a beneficial effect during a kneading step, and can, for example, help to keep the particles in the powdered catalyst materials separate. Substances may thereby be added as extrusion aids which primarily promote the formation of a plastic mass during kneading and then also support the mechanical stability of the molded body when it is shaped. These extrusion aids are removed during calcining, and they can, for example, be removed completely.

The extrusion aid can, for example, be an organic hydrocarbon compound which may contain at least one functional group selected from hydroxy, carboxy, amino, imino, amido, ester, sulfonyl, keto, and the thioanalogues thereof or several different substances from these groups, and which evaporates, decomposes or sublimates at temperatures below the temperature at which anatase is converted into rutile (915° C.), for example, to below 600° C., for example, to below 400° C., for example, during production of the titanium dioxide shaped body according to the present invention. A low-molecular organic hydrocarbon compound with at least one functional group and containing one or more oxygen atoms, for example, hydroxy, carboxy, can, for example, be used. For the purposes of the present invention, a low-molecular organic hydrocarbon compound is understood to be a hydrocarbon compound having one to twelve carbon atoms, and which has one of the substituent groups selected from hydroxy, carboxy, amino, imino, amido, imido, ester, sulfonyl, keto, and thioanalogues thereof, in particular hydroxy and carboxy.

The extrusion aid may accordingly be an acid, a base, an alkanol amine, or some other substance which evaporates, decomposes or sublimates during calcining of the titanium dioxide shaped body according to the present invention at temperatures below the temperature at which anatase is converted into rutile (915° C.), for example, to below 600° C., for example, below 400° C.

The extrusion aid can, for example, be an organic acid, for example, a carboxylic acid, in particular having one to six carbon atoms, including a di- and tricarboxylic acid, for example, acetic acid, oxalic acid, tartaric acid, maleic acid or citric acid, in particular oxalic acid. Nitric acid, ammonia, alkanol amine or an ammonia-releasing compound may also be used, for example, as an extrusion aid. Equally, carbohydrates such as cellulose, cellulose ether, tylose, glucose, polyacryl amine, polyvinyl alcohol, stearic acid, polyethylene glycol or mixtures thereof may also be used as extrusion aids. After the evaporation, sublimation or decomposition of the extrusion aid, the shaped body according to the present invention has a residual carbon content of less than 2% by weight, for example, less than 1% by weight, relative to the weight of the shaped body after calcining.

The shaped bodies produced from the catalyst materials according to the present invention typically have the following properties:

Crushing strength of >5 N/mm, in particular >8 N/mm, for example, >10 N/mm, for example, >15 N/mm, for example, >25 N/mm;

Specific surface area of >80 $m^2/g$, in particular >100 $m^2/g$, for example, >120 $m^2/g$, for example, >150 $m^2/g$, for example, >200 $m^2/g$;

$N_2$ pore volumes of >0.2 $cm^3/g$, for example, >0.3 $cm^3/g$, for example, >0.6 $cm^3/g$;

A specific total surface area per volume of more than 100,000 $m^2/l$, for example, more than 120 000 $m^2/l$.

The shaped bodies according to the present invention produced from the catalyst materials according to the present invention may be used according to the present invention as catalysts or catalyst supports for catalytically active metals such as V, W, Co, Mo, Ni, Fe, Cu, Cr, Ru, Pd, Pt, Ag, Zn for applications in the field of:

photocatalysis;

Claus catalysis;

Claus Tail gas treatment; and

SCR-, hydrotreating-, gas-to-liquid-, Fischer-Tropsch process etc.

Such a loaded titanium oxide-containing shaped body according to the present invention typically has a content of 10 to 35% by weight Mo, 0 to 6% by weight Co and/or Ni, each calculated as the metal oxide ($MoO_3$, CoO and NiO), and a content of titanium oxide having the general formula $TiO_{(2-x)}(OH)_{2x}$ with $0<x\leq 1$, in particular $0.1<x\leq 1$, and $SiO_2$, up to 100% by weight, and a specific surface area of at least 80 $m^2/g$, in particular at least 100 $m^2/g$ and a pore volume of more than 0.25 $cm^3/g$, for example, more than 0.27 $cm^3/g$, wherein the percentages by weight are relative to the total weight of the loaded titanium oxide-containing shaped body. The $MoO_3$ content of such a loaded titanium oxide-containing shaped body according to the present invention may in particular be 18 to 30% by weight. The average pore size of such a loaded titanium oxide-containing shaped body according to the present invention may be 7 to 15 nm.

The present invention will be explained in greater detail in the following experimental section, including the production examples according to the present invention and comparison examples.

Methods

Determination of Average Particle Size

In order to determine the average particle size of titanium oxide having the general formula $TiO_{(2-x)}(OH)_{2x}$, wherein $0<x\leq 1$, the aqueous "titanium oxide suspension" is first diluted in a solution of 1 g calgon/l deionised water to obtain a concentration of approximately 0.4 g $TiO_2$ in 60 ml solution. The "titanium oxide suspension" diluted in this way is then dispersed by stirring for 5 minutes in an ultrasonic bath (e.g., Sonorex Super RK106, manufactured by Bandelin) and then dispersing for 5 minutes with an ultrasonic probe (Sonifier W-450 manufactured by Branson with gold booster for amplitude amplification and ¾ inch high-performance resonator). The particle size distribution is determined using a photon correlation spectrometer with Zetasizer Advanced Software, e.g., Zetasizer 1000HSa, manufactured by Malvern. A measurement with multimode calculation is taken at a measurement temperature of 25° C. The $d_{50}$ value for the volume distribution, corresponding to the mass distribution taking into account the density is given as the average particle size $d_{50}$.

Determination of Phase and Crystallite Size According to Scherrer

An X-ray diffractogram is recorded to determine the crystal modification (phase identification). The intensities of the X-ray beams diffracted according to Bragg's law at the lattice planes of a crystal are measured against diffraction angle 2 theta therefor. The X-ray diffraction pattern is typical for a phase.

Performance and Evaluation

The material to be investigated is spread on the preparation support with the aid of an object support. The powder diffractometry data is evaluated using the JCPDS powder diffractometry database. The phase is identified when the measured diffraction diagram matches the stored line pattern.

The measurement conditions are typically: 2 theta=10° to 70°, measured in increments of 2 theta=0.02°, measurement time per stop: 1.2 s.

The size of the crystallites is determined from the peak width at half height of the anatase reflex at 2 theta of 25.3° using the Scherrer method according to the following formula:

D crystallite=K*1/(S*cos(Theta)

wherein:

D crystallite: Crystallite size [nm]

K: Shape constant=0.9

Theta: Angular position of the measurement reflex 2 Theta/2

S: Peak width at half height of the measurement reflex

1: Wavelength of the X-ray beam used.

Determination of Silicon Calculated as $SiO_2$

Weighing in and digestion of the material with sulfuric acid/ammonium sulfate, followed by dilution with distilled water, filtration and washing with sulfuric acid. Then, incineration of the filter and gravimetric determination of the $SiO_2$ content.

Determination of Titanium Calculated as $TiO_2$

Digestion of the material with sulfuric acid/ammonium sulfate or potassium sulfate. Reduction with Al to $Ti^{3+}$. Titration with ammonium iron-III-sulfate. (Indicator: $NH_4SCN$)

Calculation of the $TiO_2/SiO_2$ Ratio

The concentrations of Ti and Si, calculated as $TiO_2$ and $SiO_2$, in the sample are determined as described above. The $TiO_2/SiO_2$ ratio is then determined by dividing the calculated $TiO_2$ content by the calculated $SiO_2$ content.

Determination of the Specific Surface Area (Multipoint Method) and Analysis of the Pore Structure Using the Nitrogen-Gas Sorption Process ($N_2$ Porosimetry)

The specific surface area and the pore structure (pore volume and pore diameter) are calculated by $N_2$ porosimetry using the Autosorb 6 or 6B device manufactured by Quantachrome GmbH. The BET surface area (Brunnauer, Emmet and Teller) is determined in accordance with DIN ISO 9277, the pore distribution is measured in accordance with DIN 66134.

Sample Preparation ($N_2$ Porosimetry)

The sample weighed into the measurement cell is pre-dried in a vacuum at the baking station for 16 h. It is then heated up in a vacuum to 180° C. in about 30 minutes. The temperature is then maintained for one hour, still in a vacuum. The sample is considered to be sufficiently degassed when a the degasser records a steady pressure of 20 to 30 millitorr and the needle of vacuum display remains stable for about 2 minutes after the vacuum pump has been disconnected.

Measurement/Evaluation ($N_2$ Porosimetry)

The entire $N_2$ isotherm is measured using 20 adsorption points and 25 desorption points. The measurements were evaluated as follows:

Specific Surface Area (Multipoint BET)

5 measurement points in the evaluation range from 0.1 to 0.3 p/p0

Evaluation of Total Pore Volume

Determination of the Pore Volume According to the Gurvich Rule (Determination Using the Last Adsorption Point)

The total pore volume is determined in accordance with DIN 66134 on the basis of the Gurvich rule. According to the Gurvich rule, the total pore volume of a sample is determined from the last pressure point during the adsorption measurement:

p. Pressure of the sorption agent p0. Saturation steam pressure of the sorption agent Vp. Specific pore volume according to the Gurvich rule (the total pore volume at p/Po=0.99); practically the last adsorption pressure point reached during measurement.

Evaluation of Average Pore Diameters (Hydraulic Pore Diameter)

For this calculation, the relationship 4 $Vp/A_{BET}$ is used, corresponding to the "Average Pore Diameter". $A_{BET}$ specific surface area according to ISO 9277.

Method for Determining Photocatalytic Activity

Photoactivity can be determined from the photocatalytic decomposition of organic substances in the gas phase, such as methanol or chloroform, and the determination of photoactivity is carried out for exemplary purposes in 90 mm diameter dishes. 50 mg of the powder sample and 100 mg barium sulfate blanc fixe XR-HN (commercial product manufactured by Sachtleben Chemie GmbH) are dispersed by ultrasound with stirring in 40 ml purified water in a beaker and poured all at once into the petri dish. The suspension is evaporated to complete dryness at 50° C. in a vacuum. After the drying, an evenly distributed layer of powder must remain. The powder sample prepared in this way is conditioned for 10 hours under UV light with an irradiance value of about 10 $W/m^2$.

To determine photocatalytic activity, the powder sample is placed in the gas reactor of a gas photocatalysis unit (e.g., by Ansyco) with a UV lamp (E=5 to 40 $W/m^2$) and a connected gas chromatograph (with split/splitless injector and FID and PDD detector, control unit and amplifier, for example "Trace GC Ultra"). The illumination strength has been set to 7 $W/m^2$ beforehand and checked using a UV measuring instrument (e.g., PCE-UV34). After the sample has been installed, an overpressure of 0.6 bar is set, and the system is flushed with synthetic air (50% rel. humidity) for 10 minutes. After flushing, a gas flow of 100 l/h is set, the overpressure is lowered to 0 bar, and the system is left for 5 minutes to stabilize at this setting. Afterwards, 1.0 µl chloroform (equivalent to 12.4 µmol) is injected through the heated septum. The chromatogram measurement is carried out every 7 minutes. Irradiation is not started immediately, to allow the test gas to reach adsorption/desorption equilibrium, i.e., until the content of the test gas deviates from the average by not more than 0.2 µmol for four consecutive measurements. After this equilibrium has been established, irradiation with the UV lamp is begun. A GC measurement of the chloroform content in the reactor is then taken every 7 minutes. The GC was calibrated for chloroform beforehand.

The specific photocatalytic decomposition rate in mmol/($h*m^2$) is determined by means of a linear regression based on the data for 0 and 7 min. The specific decomposition rate is calculated as follows:

$$spec \cdot decomp \cdot \text{rate} = \frac{\Delta n(\text{Substance})}{\Delta t \cdot A(\text{sample})}$$

Method for Determining the Isoelectric Point

The isoelectric point of particles is defined as the pH value at which the zeta potential is zero. In this context, the zeta potential is the electrical potential (also called Coulomb potential) at the interfacial layer of a moving particle in a suspension. The electrophoretic mobility is measured in a "PA Field ESA device" with titration unit. The pressure amplitude of ultrasound waves that are created when electrostatically charged particles are exposed to an electrical alternating field in a frequency range of about 0.8 to 1.2 MHz is measured.

The following equation applies: $ESA = c \cdot \Phi \Delta \rho \cdot \mu$ wherein:

ESA=Electrokinetic Sonic Amplitude (Signal pressure amplitude)

c=Speed of sound in the solution

Φ=Volume fraction of the particles

Δρ=Density difference between particles and solution

µ=Electrophoretic mobility

To prepare the sample, the powder is first mixed with demineralised water by vigorous shaking in a flask (2% by volume powder). The PA Field ESA device is used to measure the ESA signal of the suspended particles as a function of the pH value of the suspension. The suspension is titrated with hydrochloric acid (c(HCl)=1 mol/l) and (c(NaOH)=1 mol/l) therefor. The zeta potential can be calculated from the electrophoretic mobility. For aqueous and solvent-containing systems, this is done by the "PA Field ESA Software". Electrophoretic mobility is plotted against the pH value. The isoelectric point corresponds to the pH value at which electrophoretic mobility is equal to zero.

EXAMPLES

Comparison Example 1 (VB1)

Titanium dioxide in the anatase modification with a specific surface area of about 330 $m^2/g$, a pore volume of about 0.3 $cm^3/g$, and a sulfate content of about 1.5% by weight/$TiO_2$.

Comparison Example 2 (VB2)

833 mL metatitanic acid (from Sachtleben Chemie GmbH) with a titanium dioxide content of 300 g $TiO_2$/l was placed in a 2l glass beaker. 67.6 mL water glass (360 g $SiO_2$/L) was added at a metered rate of 2.0 mL/min while stirring. The pH value was then determined at 4.5/21° C. The suspension was stirred for 5 minutes longer and neutralized to pH 6.5/24° C. with caustic soda, wherein 400 ml partially demineralised water was added at pH=5.0. The suspension was heated to 60° C. and allowed to mature at this temperature for 1 hour with stirring. The suspension was filtered through a Büchner funnel and washed. In the last wash filtrate, a conductivity of 40 µS/cm was measured. The washed filter cake was dried at a temperature of 150° C. for four hours in a drying cabinet with forced air convection and then ground in the IKA laboratory mill for 10 seconds.

Comparison Example 3 (VB3)

500 mL partially demineralised water was provided in a 5 L glass beaker and stirred with a dissolver, Dispermat LL30, and a dissolver disc with a diameter of 6 cm. To bring about precipitation, the educts 1.92 L titanyl sulfate solution (HOMBITYL, $c(TiO_2)$=112 g/L), 108 mL Na-silicate solution ($c(SiO_2)$=200 g/L) and 2.47 L ammonia solution (w(NH3)=15%) were added to the water feed while stirring within 190 minutes, and the pH value was maintained in the range pH=5 to 6 during precipitation. Precipitation was begun with a rotating speed of 700 rpm and increased to 1000 rpm as the volume of precipitate rose. At the end of the precipitation, a pH value of 5.4 was measured at 45° C. in the precipitation suspension. The precipitation suspension was heated to 80° C. with stirring and allowed to mature for 1 hour at this temperature for 1 h. The pH value of the precipitation suspension was then determined at 4.8/80° C. and adjusted with dilute sulfuric acid (20%) to pH 4.25/80° C. The suspension was filtered through a Büchner funnel and the filter cake was washed. After washing, a conductivity of 342 µS/cm was found in the filtrate. The washed filter cake was dried overnight at a temperature of 150° C. in the drying cabinet then ground in the IKA laboratory mill for 10 s.

Example According to the Present Invention 1 (EB 1)

A "titanium oxide suspension" with an average particle size of 50 nm and a $TiO_2$ content of 50 g $TiO_2$/l was used as the feedstock. 6 l of the "titanium oxide suspension" was dispersed for 15 minutes using a dissolver. The pH value of the suspension was adjusted to pH=6.5 with dilute caustic soda. Then, 34 ml of a Na-silicate solution with (350 g $SiO_2$/l) was added to the titanium oxide suspension within 15 minutes while the dissolver dispersion continued. The suspension was matured for 60 minutes at 60° C. with vigorous stirring. The suspension was then filtered, washed, and spray dried.

Example According to the Present Invention 2 (EB 2)

A "titanium oxide suspension" with an average particle size of 50 nm and a $TiO_2$ content of 50 g $TiO_2$/l was used as the feedstock. 6 l of the "titanium oxide suspension" was dispersed for 30 minutes in a torus mill (manufacturer Getzman). The pH value of the suspension was adjusted to pH=7.5 with dilute caustic soda. Then, 68 ml of a Na-silicate solution with (350 g $SiO_2$/l) was added to the titanium oxide suspension within 30 minutes while dispersion continued. The suspension was matured for 60 minutes at 60° C. with vigorous stirring. The suspension was then filtered, washed, and spray dried.

Example According to the Present Invention 3 (EB 3)

A "titanium oxide suspension" with an average particle size of 50 nm and a $TiO_2$ content of 50 g $TiO_2$/l was used as the feedstock. 6 l of the "titanium oxide suspension" was dispersed for 15 minutes in a rotor-stator dispersion unit (ULTRA-TURRAX by IKA). The pH value of the suspension was adjusted to pH=7.5 with dilute caustic soda. Then, 100 ml of a Na-silicate solution with (350 g $SiO_2$/l) was added to the titanium oxide suspension within 20 minutes while dispersion continued. The suspension was matured for 60 minutes at 60° C. with vigorous stirring. The suspension was then filtered, washed and spray dried.

Example According to the Present Invention 4 (EB 4)

A "titanium oxide suspension" with an average particle size of 50 nm and a $TiO_2$ content of 100 g $TiO_2$/l was used as the feedstock. 1.5 l of the "titanium oxide suspension" was dispersed for 15 minutes using a dissolver. The pH value of the suspension was adjusted to pH=6.0 with dilute caustic soda. Then, 15.9 ml of a Na-silicate solution with (378 g $SiO_2$/l) was added to the titanium oxide suspension within 15 minutes while dissolver dispersion continued. The suspension was matured for 30 minutes at 60° C. with vigorous stirring. Then, the suspension was filtered, washed and spray dried.

Example According to the Present Invention 5 (EB 5)

A "titanium oxide suspension" with an average particle size of 50 nm and a $TiO_2$ content of 100 g $TiO_2$/l was used as the feedstock. 1.5 l of the "titanium oxide suspension" was dispersed for 15 minutes using a dissolver. The pH value of the suspension was adjusted to pH=6.0 with dilute caustic soda. Then, 31.8 ml of a Na-silicate solution with (378 g $SiO_2$/l) was added to the titanium oxide suspension within 15 minutes while dissolver dispersion continued. The suspension was matured for 30 minutes at 60° C. with vigorous stirring. The suspension was then filtered, washed, and spray dried.

The structural properties as well as the thermal stability and photocatalytic activity of the powders according to the present invention and of the comparison examples are listed in Table 1.

According to the prior art, $SiO_2$-stabilised titanium dioxides are known which have (acceptable) specific surface areas of about 200 $m^2/g$ after thermal aging (see e.g., Comparison Examples 2 and 3). The photocatalytic activity of these products is, however, very low (chloroform decomposition rate not more than 0.1 mmol/h*$m^2$). The poor photocatalytic activity is presumably due to the fact that the surface of the photocatalytically active titanium dioxide is covered by inactive $SiO_2$ and at the same time associated with relatively low IEPs (3.8 to 4.4).

Pure titanium dioxide such as the commercially available product used for VB1 demonstrates acceptable photocatalytic decomposition rates, but these titanium dioxides are not thermally stable. The specific surface area of these products is in a range of just 80 to 100 $m^2/g$ after 1 hour at 500° C. Such materials cannot therefore be used as catalysts or catalyst supports for applications with elevated temperatures.

Only the materials according to the present invention combine very high photocatalytic activity (chloroform decomposition rates of >0.7 mmol/h*$m^2$) with good thermal stability, i.e., specific surface areas equal to or greater than 130 $m^2/g$ after thermal treatment for 1 hour at 500° C.

TABLE 1

| | | | | BET after Aging* [m²/g] | Pore volume [cm³/g] | Average Pore Diameter [nm] | Photocatalytic Chloroform Decomp. [mmol/h * m²]: |
|---|---|---|---|---|---|---|---|
| No. | Material | TiO₂/SiO₂-Ratio | IEP | BET [m²/g] | | | |
| VB1 | Titanium dioxide in anatase modification | n.a. | 6 | 350 | 80 | 0.3 | 3.4 | 0.6 |
| VB2 | Titanium dioxide in anatase modification, treated with Na-silicate solution | 10 | 4.4 | 295 | 222 | 0.3 | 4.1 | <0.1 |
| VB3 | Coprecipitation from TiOSO₄, NH₄OH, Na-silicate solution | 10 | 3.8 | 435 | 197 | 0.4 | 3.8 | 0.1 |
| EB1 | Titanium oxide with SiO₂ | 25 | 5.6 | 350 | ~160 | 0.8 | 9.1 | 2.0 |
| EB2 | Titanium oxide with SiO₂ | 12.5 | 5.3 | 350 | ~220 | 0.8 | 9.1 | 0.9 |
| EB3 | Titanium oxide with SiO₂ | 8.5 | 4.8 | 350 | ~240 | 0.8 | 9.1 | 0.8 |
| EB4 | Titanium oxide with SiO₂ | 25 | 5.7 | 304 | ~195 | 0.75 | 9 | n.a. |
| EB5 | Titanium oxide with SiO₂ | 12.5 | 5.4 | 311 | ~190 | 0.7 | 9 | n.a. |

*Aging for 1 hour at 500° C.

Production of Catalyst Supports by Extrusion

The materials produced in the preceding examples and comparison examples were used to prepare catalyst supports, wherein an extrusion process was implemented using an extrusion aid. A coated powdered catalyst material can accordingly be obtained by treating a suspension of particles according to the present invention with the extrusion aid or mixtures of several extrusion aids in solution or suspension, and as a result the surface area of the particles according to the present invention is coated with the extrusion aid(s) and the coated particles are subsequently extruded to produce shaped bodies.

VB1-E 400 g Hombikat M211 (titanium dioxide, commercial product manufactured by Sachtleben) and 64 g of an aqueous 2.5% tylose solution are placed in the mixing trough of the double z kneader and mixed for about 1 minute. 60 g of 10% by weight hydrochloric acid is then added, and also demineralised water until the kneading mass has a plastic consistency. This mixture is then kneaded for 30 minutes. Subsequently, 20 g ammonia water (25%) and 20 ml demineralised water are added and the mixture is kneaded for 30 minutes. The kneading mass is then extruded under pressure of 40 to 70 bar through a 1.8 mm die ("Quadrilobe" shape) and cut to the desired length (approximately 15 to 20 mm). The extrudates produced in this way are air dried and then heated to 90° C. for 60 minutes, then to the calcining temperature of 400° C. over the course of several hours and maintained at this temperature for 120 minutes, then cooled to room temperature.

VB2-E 400 g of Example 2 and 64 g of an aqueous 2.5% tylose solution is placed in the mixing trough of the double z kneader and kneaded for about 1 minute. 60 g of 10% by weight hydrochloric acid is then added, and also demineralised water until the kneading mass has a plastic consistency (about 70 ml). This mixture is then kneaded for 30 minutes. Subsequently, 20 g ammonia water (25%) and 20 ml demineralised water are added and the mixture is kneaded for 30 minutes. The kneading mass is then extruded under pressure of 40 to 70 bar through a 1.8 mm die ("Quadrilobe" shape) and cut to the desired length (approximately 15 to 20 mm). The extrudates produced in this way are first air dried and then tempered as described in Example 1.

EB1-E 400 g of the powder of EB1 and 64 g of an aqueous 2.5% tylose solution are placed in the mixing trough of the double z kneader and kneaded for about 1 minute. Then the pH value of the kneading mass is adjusted to pH=1.5 by the addition of hydrochloric acid, and demineralised water is also added until the kneading mass has a plastic consistency. This mixture is then kneaded for 30 minutes. Subsequently the pH value of the kneading mass is adjusted to pH=5 for the addition of ammonia water (25%) and kneaded for a further 30 minutes. The kneading mass is then extruded under pressure of 20 to 40 bar through a 1.8 mm die ("Quadrilobe" shape) and cut to the desired length (approximately 15 to 20 mm). The extrudates produced in this way are first air dried and then tempered as described in Example 1.

EB2-E and EB3-E

The production of extrudates from the powders of EB2 and EB3 was carried out in similar manner to the extrusion of powder EB1 (EB1-E) described above.

TABLE 2

Extrudate Properties

| Example | Specific Surface Area (5 point BET) [m$^2$/g] | Pore Volume (Total) [cm$^3$/g] | Average Pore Diameter [nm] | Phase | SCS [N/mm] | TBD [g/l] | Total Surface Area per Volume [5 point BET × TBD] [m$^2$/l] |
|---|---|---|---|---|---|---|---|
| VB1-E | 142 | 0.3 | | Anatase | | | |
| VB2-E | n.b. | n.b. | 8 | Anatase | 30 | 675 | |
| EB1-E | 215 | 0.59 | n.b. | Anatase | n.b. | n.b. | 95850 |
| EB2-E | 255 | 0.55 | 11 | Anatase | 13 | 505 | |
| EB3-E | 260 | 0.58 | 9 | Anatase | 12 | 617 | 108575 |

Impregnation

The extrudates produced for extrusion in the Examples were intended for impregnation with active metals such as NiMo- and CoMo. For this purpose, in a first step, CoMo- and NiMo-containing impregnation solutions were prepared as follows:

Preparation of CoMo- or NiMo Impregnation Solutions

The impregnation solutions were prepared in aqueous solution using corresponding metal compounds such as salts or oxides in the presence of phosphoric acid and the pH thereof was adjusted with nitric acid.

Impregnation of the Extrudates

For the impregnation, 100 g of each of the extrudate were placed in a rotating vessel (e.g., rotary evaporator). The impregnation solution was added slowly (0.5 ml/min) to the extrudates. After the metered addition of the impregnation solution, the impregnated extrudates were aged for 24 hours and then first dried at 120° C. and then tempered at 350° C. After this calcining process, the catalysts are finished. The sulfiding of the Mo species is then carried out in the hydrotreating reactor as part of the "activation procedure".

Examination of Hydrotreating Activity

The catalytic performance of the catalysts with regard to "hydrodesulfurization" (HDS) and hydrodenitrogenation (HDN) was tested using the example of a vacuum gas oil (VGO) in a 16 chamber "trickle-bed reactor" built by HTE.

Sample Preparation

The catalysts were tested as whole extrudates without being reduced in size. For this purpose, extrudates with a length of 2 to 4 mm were selected and placed in reactors with internal diameters of 5 mm. After the reactors were filled with the respective catalyst materials, silicon carbide SiC (size 125 to 160 μm) was added in a catalyst/SiC volume ratio of 1/0.65. This bulk catalyst material filled with SiC particles was compacted. The catalyst quantity was selected such that after compacting a reactor volume of 2 ml was filled in each case. The catalyst mass was calculated from the tapped bulk density (TBD) of the catalysts (see Table 3). In all, the reactor has three zones, the upper and lower zones are filled exclusively with SiC particles (125 to 160 μm), the middle zone is filled with the mixture of SiC, and catalyst extrudates described above.

Raw Materials

A Vacuum Gas Oil (VGO) (raw material for a mild hydrocracker) with the following properties was used as the raw material:

Sulfur content: 27075 mg S/kg
Nitrogen content: 968 mg N/kg
Density at 15° C.: 0.9273 g/ml
Density at 70° C.: 0.8919 g/ml In order to activate the catalysts, a LGO feed (Light Gas Oil) was reacted with dimethyl disulfide (DMDS). The resulting LGO/DMDS mixture had the following properties:

Sulfur content: 24418 mg S/kg
Nitrogen content: 116 mg N/kg
Density at 15° C.: 0.8589/ml Activation Procedure Before the extrudates coated with metal were investigated with regard to their catalytic properties, they were activated in the test unit described above. The objective of activation is the sulfidisation of the Mo compounds to form catalytically active molybdenum sulfide. To this end, the reactors filled with the catalysts were installed on the test bench and exposed to the LGO/DMDS mixture. In this process, a pressure of 60 bar and a liquid hourly space velocity (LHSV) of 2 h$^{-1}$ were used. The gas-to-oil ratio (H$_2$ to LGO/DMDS mixture) was 200 standard liters/(h 1). For activation, the following temperature profile was used:

1. Wetting with LGO at about 35° C.: 24 h
2. Temperature increase from 35° C. to 150° C. in steps of 25° C./h
3. Temperature increase from 150° C. to 250° C. in steps of 15° C./h
4. T=250° C. for 14 hours until H$_2$S signal stable
5. Temperature increase from 250° C. to 320° C. in steps of 10° C./h
6. T=320° C. for 11 Hours until H$_2$S signal stable Test Conditions To investigate the hydrotreating performance of the catalysts, the following test conditions were selected:

1. Pressure: p=80 bar,
   Gas-to-oil ratio: H$_2$/VGO: 600 Nl(H$_2$)/h/l(VGO),
   Liquid hourly space velocity (LHSV): 1.0 [1/h],
   Temperature: T=370° C., 380° C., 390° C.
2. Pressure: p=120 bar,
   Gas-to-oil ratio: H$_2$/feed: 600 Nl(H$_2$)/h/l(VGO).
   Liquid hourly space velocity (LHSV): 1.0 [1/h],
   Temperature: T=400° C. and 385° C.

The various settings were each kept constant for at least three days. The temperature changes were made in increments of 10° C./h.

Analysis of the Vacuum-Gas-Oil after Catalytic Treatment

The volatile organic products (C1-C7) and the permanent gases (H$_2$, H$_2$S, TCD) were analyzed by online gas chromatography. To determine sulfur and nitrogen contents as well as densities, product samples were drawn and analyzed offline. The results of the catalytic tests are shown in Table 3.

The results shown in Table 3 show that the inventive catalysts result in significantly lower sulfur contents in the treated vacuum-gas-oil. This therefore demonstrates that the catalyst materials according to the present invention and the supports coated with active metal produced with the aid thereof and thus also the CoMo- and NiMo catalysts according to the present invention exhibit significantly improved catalytic performance in terms of HDS- and HDN activity than the prior art.

The present invention is not limited to embodiments described herein; reference should be had to the appended claims.

TABLE 3

Catalyst Properties and Catalytic Performance

| Sample Powder from Example | Charge | Metal load MoO₃ [wt. %] | Metal load CoO [wt. %] | Metal load NiO [wt. %] | Physical Properties of the Catalysts Spec. surf. area (5-pt. BET) [m²/g] | Pore volume (Total) [cm³/g] | Avg. pore size [nm] | TBD [g/l] | Catalytic Performance (Properties of the VGO after "catalytic treatment") 390° C., LHSV 1 h⁻¹, 80 bar S Content in the product [mg/kg] | 390° C., LHSV 1 h⁻¹, 80 bar N Content in the product [mg/kg] | 400° C., LHSV 1 h⁻¹, 120 bar S Content in the product [mg/kg] | 400° C., LHSV 1 h⁻¹, 120 bar N Content in the product [mg/kg] | Product density |
|---|---|---|---|---|---|---|---|---|---|---|---|---|---|
| VB1 | CoMo | 24 | 4.3 | — | 55 | 0.14 | 9 | 1060 | 583 | 127 | 76 | 3 | 0.8333 |
| VB2 | CoMo. | 24 | 4.3 | — | 65 | 0.09 | 6 | 1180 | 462 | 109 | 60 | 2 | 0.8313 |
| EB1 | CoMo. | 24 | 4.3 | — | 110 | 0.36 | 13 | 943 | 70 | 27 | 24 | 1 | 0.8257 |
| EB2 | CoMo. | 18 | 3.6 | — | 182 | 0.39 | 9 | 871 | 71 | 23 | 24 | 2 | 0.8238 |
| EB2 | CoMo. | 24 | 4.3 | — | 119 | 0.32 | 11 | 1008 | 85 | 31 | 25 | 1 | 0.8256 |
| EB2 | NiMo. | 27.0 | — | 4.7 | 96 | 0.28 | 12.0 | 1014 | 64 | 11 | 22 | 0 | 0.8217 |
| EB3 | CoMo. | 24 | 4.3 | — | 122 | 0.33 | 11 | 950 | 63 | 23 | 21 | 1 | 0.8239 |

What is claimed is:

1. A powdered catalyst material comprising:
   a combined content of at least 90 wt.-% of,
      a hydrated titanium oxide having the general formula $TiO_{(2-x)}(OH)_{2x}$, with $0<x\leq 1$, (calculated as $TiO_2$), and
      at least one of a silicon dioxide and hydrated precursors of the silicon dioxide (calculated as $SiO_2$);
   a specific surface area of $>300$ m²/g;
   an isoelectric point of from 4.0 to 7.0; and
   a total pore volume (N₂ desorption) of at least 0.7 cm³/g, wherein,
   a weight ratio of $TiO_2/SiO_2$, determined for $TiO_2$ and $SiO_2$ respectively, is at least 3 and less than 30, and
   the wt.-% for both the combined content of at least 90 wt.-% and for the weight ratio of $TiO_2/SiO_2$ is based on a total weight of the powdered catalyst material after the powdered catalyst material has been dried at 105° C. for at least 2 hours.

2. The powdered catalyst material as recited in claim 1, further comprising:
   a photocatalytic chloroform decomposition rate of more than 0.3 mmol/(h*m²).

3. The powdered catalyst material as recited in claim 1, wherein the total pore volume (N₂ desorption) is at least 0.75 cm³/g.

4. The powdered catalyst material as recited in claim 1, further comprising:
   a specific surface area of at least 80 m²/g after a thermal treatment for 1 hour at 500° C. under a normal atmosphere.

5. The powdered catalyst material as recited in claim 1, wherein the isoelectric point is from 4.5 to 5.9.

6. The powdered catalyst material as recited in claim 1, wherein an X-ray diffractogram of the powdered catalyst material has a ratio of a height of a most intensive reflex of an anatase structure (reflex (101)) to a height of a most intensive reflex of a rutile structure (reflex (110)) which is at least 5:1 after a deduction of a linear subsurface.

7. A process for preparing the powdered catalyst material as recited in claim 1, the process comprising:
   reacting an aqueous suspension of titanium oxide hydrate particles having the general formula $TiO_{(2-x)}(OH)_{2x}$ with $0<x\leq 1$ with an Si-containing compound while stirring so as to obtain a suspension;
   filtering the suspension so as to obtain a filter cake; and
   washing the filter cake with water until a filtrate is obtained which has a conductivity of not more than 500 μS/cm.

8. The process as recited in claim 7, wherein,
   for the reacting of the aqueous suspension of titanium oxide hydrate particles having the general formula $TiO_{(2-x)}(OH)_{2x}$, $0.1<x\leq 1$, and
   the titanium oxide hydrate particles have an average particle size of from 20 to 500 nm, and
   the process further comprises:
      adding an acid or a base during the reacting of the aqueous suspension of titanium oxide hydrate particles with the Si-containing compound when obtaining the suspension so as to maintain a pH value in a range of from 3 to 9; and
      readjusting the pH value to be in a range of from 4 to 7.

9. The process as recited in claim 7, wherein a $Na_2SiO_3$ solution with a $SiO_2$ concentration of from 100 to 500 g $SiO_2$/l is used as the Si-containing compound.

10. The process as recited in claim 7, wherein,
    the reacting of the aqueous suspension of titanium oxide hydrate particles with the Si-containing compound while stirring occurs by adding an Si-containing solution to the aqueous suspension of titanium oxide hydrate particles, and
    the process further comprises:
       adjusting a pH value of the titanium oxide suspension to be in a range of from 4.0 to 8.5 by adding an acid or a base before adding of the Si-containing solution, and
       maintaining the pH value during the addition of the Si-containing solution.

11. A method of using the powdered catalyst material as recited in claim 1 for preparing a shaped body, the process comprising:

providing the powdered catalyst material as recited in claim 1;

shaping the powdered catalyst material into a shaped body; and using the shaped body for at least one of a catalytic application or as a support for a catalytically active metal in a field of catalysis.

12. A shaped body on a titanium oxide basis comprising:

the powdered catalyst material as recited in claim 1; and a specific surface area of $>80$ m$^2$/g.

13. The shaped body as recited in claim 12, further comprising:

a pore volume (N$_2$, Total) of more than 0.2 cm$^3$/g.

14. The shaped body as recited in claim 12, further comprising:

a specific total surface area per volume of more than 100,000 m$^2$/l.

15. The shaped body as recited in claim 12, further comprising:

10 to 35 wt.-% of Mo, calculated as a metal oxide (MoO$_3$);

0 to 6 wt.-% of at least one of Co and Ni, calculated as respective metal oxides (CoO and NiO);

the rest up to 100 wt.-% of titanium oxide with the general formula TiO$_{(2-x)}$(OH)$_{2x}$, where $0<x\leq 1$, and SiO$_2$;

a specific surface area of at least 80 m$^2$/g; and a pore volume of more than 0.25 cm$^3$/g, wherein, each wt.-% is based on a total weight of the shaped body.

16. The shaped body as recited in claim 15, wherein the shaped body comprises 18 to 30 wt.-% of MoO$_3$.

17. The shaped body as recited in claim 15, further comprising an average pore size of from 7 to 15 nm.

18. A method of using the shaped body as recited in claim 12 as a catalyst or as a support for a catalytically active metal in a field of catalysis, the method comprising:

providing the shaped body as recited in claim 12; and using the shaped body as a catalyst or as a support for a catalytically active metal in a field of catalysis.

19. The method as recited inn claim 18, wherein the field of catalysis is selected from a photo catalysis, a Claus catalysis, a Claus-Tail-Gas-treatment, SCR, a hydro treating, a gas-to-liquid-process, and a Fischer-Tropic-Process.

* * * * *